(12) United States Patent
Kumaran et al.

(10) Patent No.: US 10,938,664 B2
(45) Date of Patent: Mar. 2, 2021

(54) DETECTING NETWORK ENTITY GROUPS WITH ABNORMAL TIME EVOLVING BEHAVIOR

(71) Applicant: Cisco Technology, Inc., San Jose, CA (US)

(72) Inventors: Vikram Kumaran, Cary, NC (US); Santosh Ghanshyam Pandey, Fremont, CA (US); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 16/132,933

(22) Filed: Sep. 17, 2018

(65) Prior Publication Data

US 2020/0092172 A1    Mar. 19, 2020

(51) Int. Cl.
| | |
|---|---|
| *G06F 15/16* | (2006.01) |
| *H04L 12/24* | (2006.01) |
| *H04B 17/345* | (2015.01) |
| *H04B 17/318* | (2015.01) |
| *H04B 17/336* | (2015.01) |
| *H04L 12/733* | (2013.01) |

(52) U.S. Cl.
CPC .......... *H04L 41/12* (2013.01); *H04B 17/318* (2015.01); *H04B 17/336* (2015.01); *H04B 17/345* (2015.01); *H04L 41/065* (2013.01); *H04L 41/0893* (2013.01); *H04L 45/126* (2013.01)

(58) Field of Classification Search
CPC ..... H04L 41/12; H04L 41/065; H04B 17/318; H04B 17/336; H04B 17/345; H04W 76/10

USPC ......................................................... 709/224
See application file for complete search history.

(56) References Cited

U.S. PATENT DOCUMENTS

| | | | |
|---|---|---|---|
| 9,324,119 B2 | 4/2016 | Singh et al. | |
| 10,582,372 B2* | 3/2020 | Munoz Sanchez | ........................ H04L 41/5029 |
| 2006/0074946 A1* | 4/2006 | Pham | .................... H04L 41/042 |

(Continued)

OTHER PUBLICATIONS

Lopes et al., "The two-dimensional Kolmogorov-Smirnov test", Apr. 27, 2007, XI International Workshop on Advanced Computing and Analysis TEchniques in Physics Research.*

(Continued)

*Primary Examiner* — Douglas B Blair
(74) *Attorney, Agent, or Firm* — Behmke Innovation Group LLC; Kenneth J. Heywood; Jonathon P. Western

(57) ABSTRACT

In one embodiment, a network assurance service that monitors a network calculates network frequency distributions of a performance measurement from the network over a plurality of different time periods. The service calculates entity frequency distributions of the performance measurement for a plurality of different groupings of one or more network entities in the network over the plurality of different time periods. The service determines distance measurements between the network frequency distributions and the entity frequency distributions. The service identifies a particular one of the grouping of one or more networking entities as an outlier, based on a change in distance measurements between the network frequency distributions and the entity frequency distributions for the particular grouping. The service provides an indication of the identified outlier grouping to a user interface.

18 Claims, 11 Drawing Sheets

(56) References Cited

U.S. PATENT DOCUMENTS

| | | | |
|---|---|---|---|
| 2015/0373039 A1 | 12/2015 | Wang | |
| 2016/0094565 A1* | 3/2016 | Adams | H04L 63/145 |
| | | | 726/24 |
| 2018/0227210 A1* | 8/2018 | Cosgrove | H04L 43/16 |
| 2019/0121676 A1* | 4/2019 | Barinov | H04M 3/5238 |
| 2019/0132224 A1* | 5/2019 | Verma | H04L 47/2441 |

OTHER PUBLICATIONS

Shashanka, et al., "User and Entity Behavior Analytics for Enterprise Security", 2016 IEEE International Conference on Big Data, pp. 1867-1874, 2016, IEEE.

Sood, et al., "Cisco Enterprise Wireless Intuitive Wi-Fi Starts Here", https://www.cisco.com/c/dam/en/us/products/collateral/wireless/nb-06-wireless-wifi-starts-here-ebook-cte-en.pdf, May 2018, pp. 1-150, Cisco.

"The CISO's Guide to Machine Learning & User and Entity Behavioral Analytics", https://www.arubanetworks.com/assets/CisoGuide.pdf, Accessed on Aug. 22, 2018, pp. 1-37, arubanetworks.com.

\* cited by examiner

DETECTING NETWORK ENTITY GROUPS WITH ABNORMAL TIME EVOLVING BEHAVIOR

TECHNICAL FIELD

The present disclosure relates generally to computer networks, and, more particularly, to detecting network entity groups with abnormal time evolving behavior.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
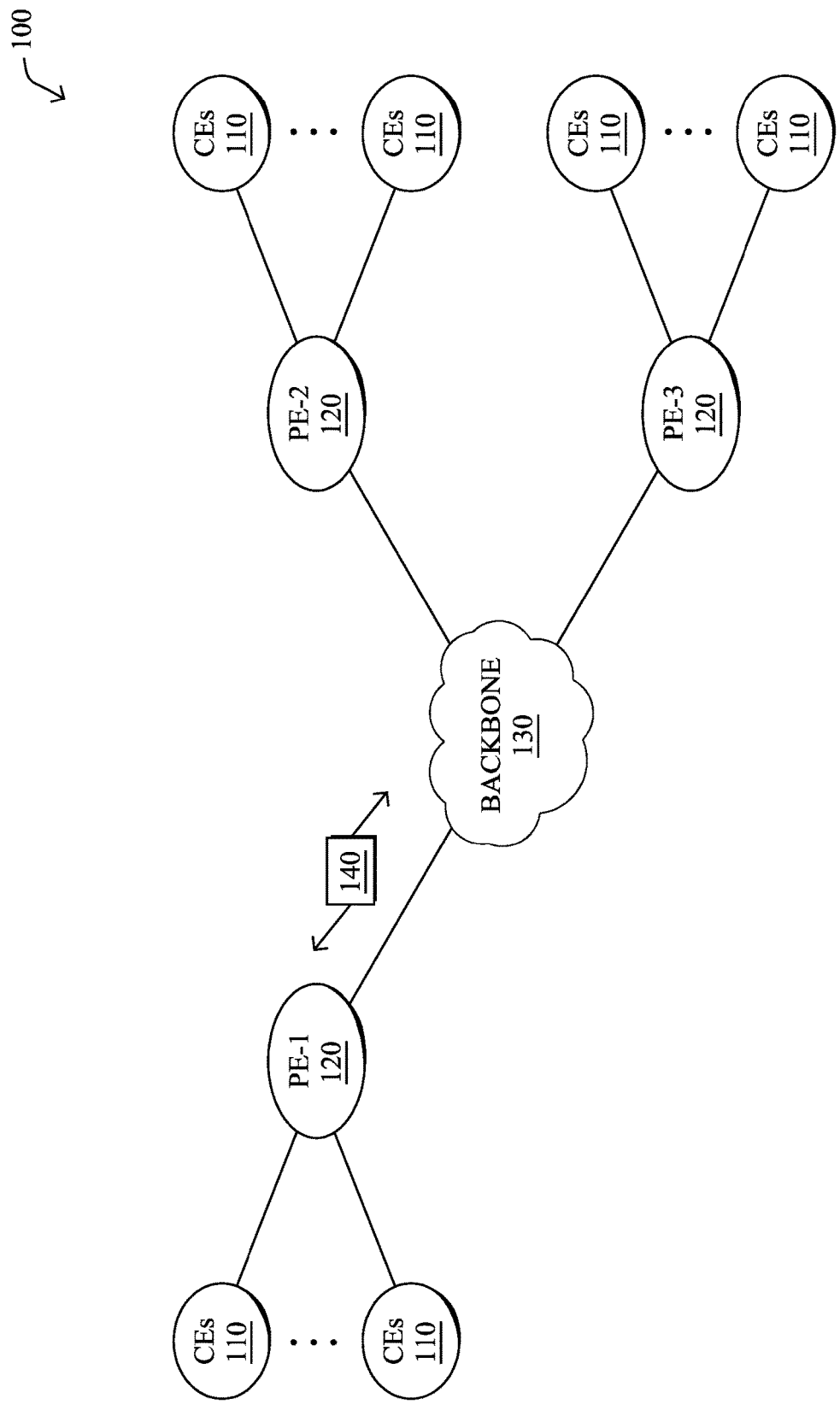
FIGS. 1A-1B illustrate an example communication network.

According to one or more embodiments of the disclosure, a network assurance service that monitors a network calculates network frequency distributions of a performance measurement from the network over a plurality of different time periods. The service calculates entity frequency distributions of the performance measurement for a plurality of different groupings of one or more network entities in the network over the plurality of different time periods. The service determines distance measurements between the network frequency distributions and the entity frequency distributions. The service identifies a particular one of the grouping of one or more networking entities as an outlier, based on a change in distance measurements between the network frequency distributions and the entity frequency distributions for the particular grouping. The service provides an indication of the identified outlier grouping to a user interface.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc, that cooperatively monitor physical or environmental conditions at different locations, such as, e.g, energy/power consumption, resource consumption (e.g, water/gas/etc. for advanced metering infrastructure or "AMI" applications) temperature, pressure, vibration, sound, radiation, motion, pollutants, etc. Other types of smart objects include actuators, e.g, responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g, sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g, PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
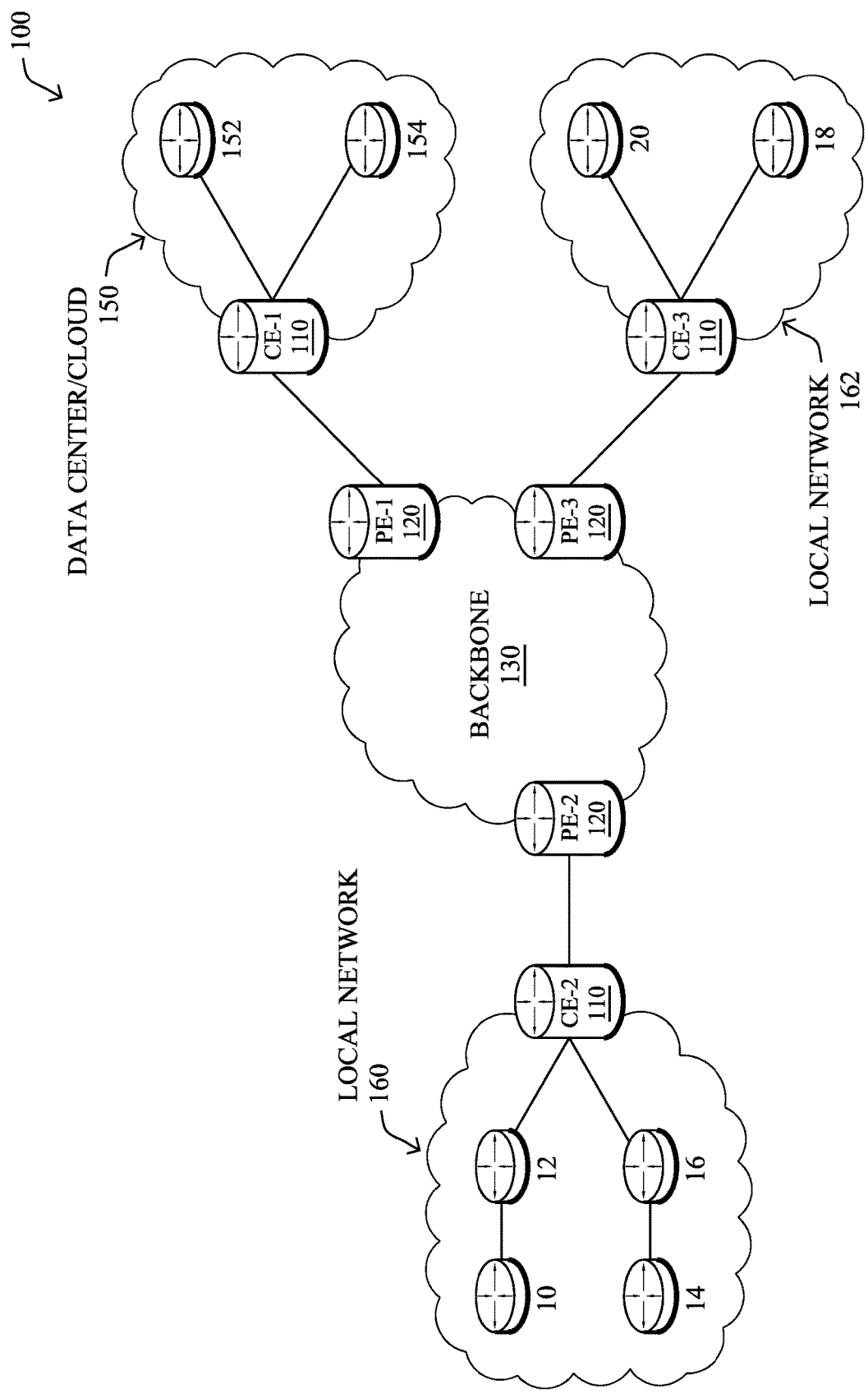

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an authentication, authorization and accounting (AAA) server, an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
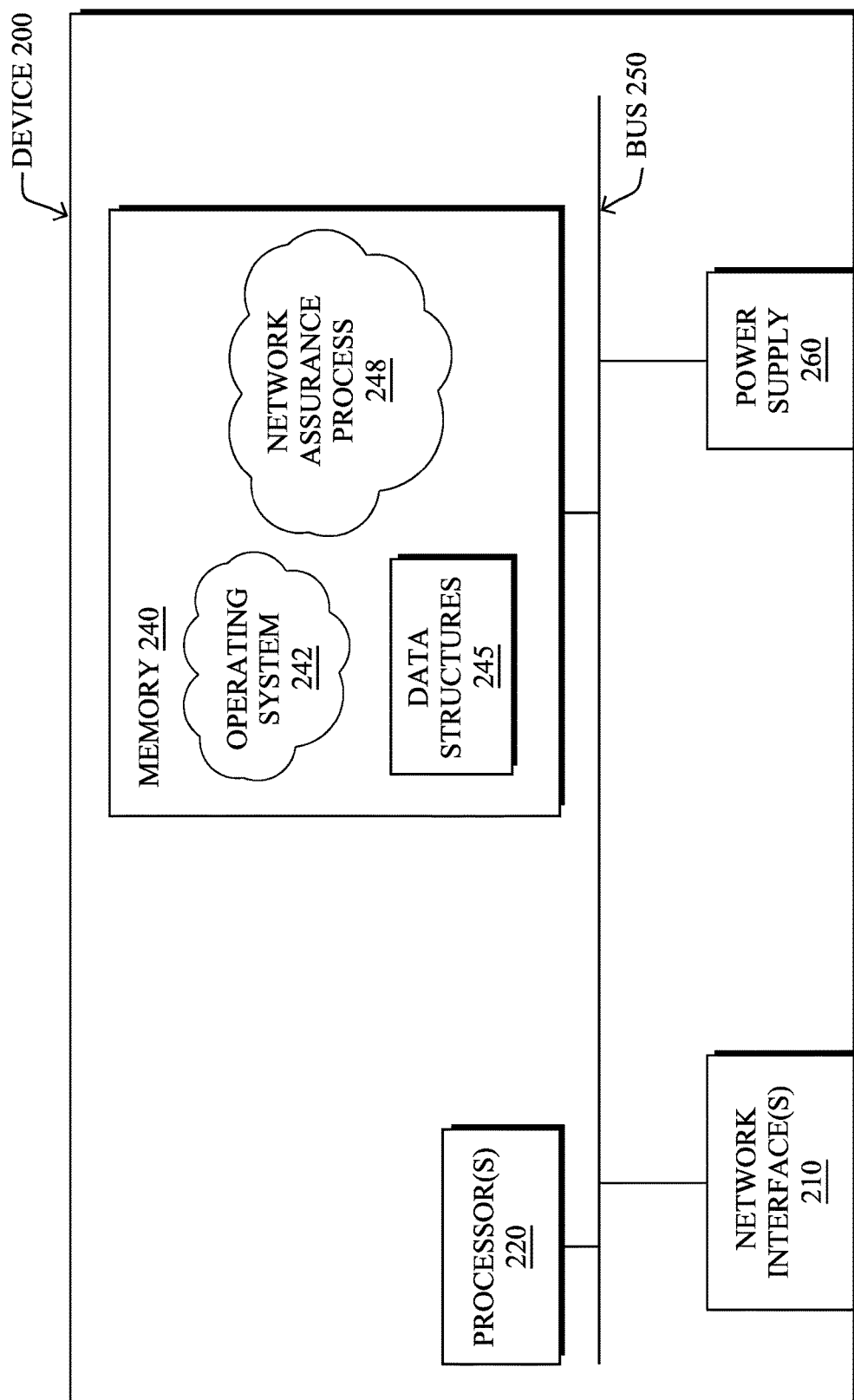
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g, a network controller located in a data center, etc.), any other computing device that supports the operations of network 100 (e.g, switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc, another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g, according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g, the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason code to the assurance system. To evaluate a rule regarding these conditions, the network assurance system may then group 150 failures into different "buckets" (e.g, Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g, labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
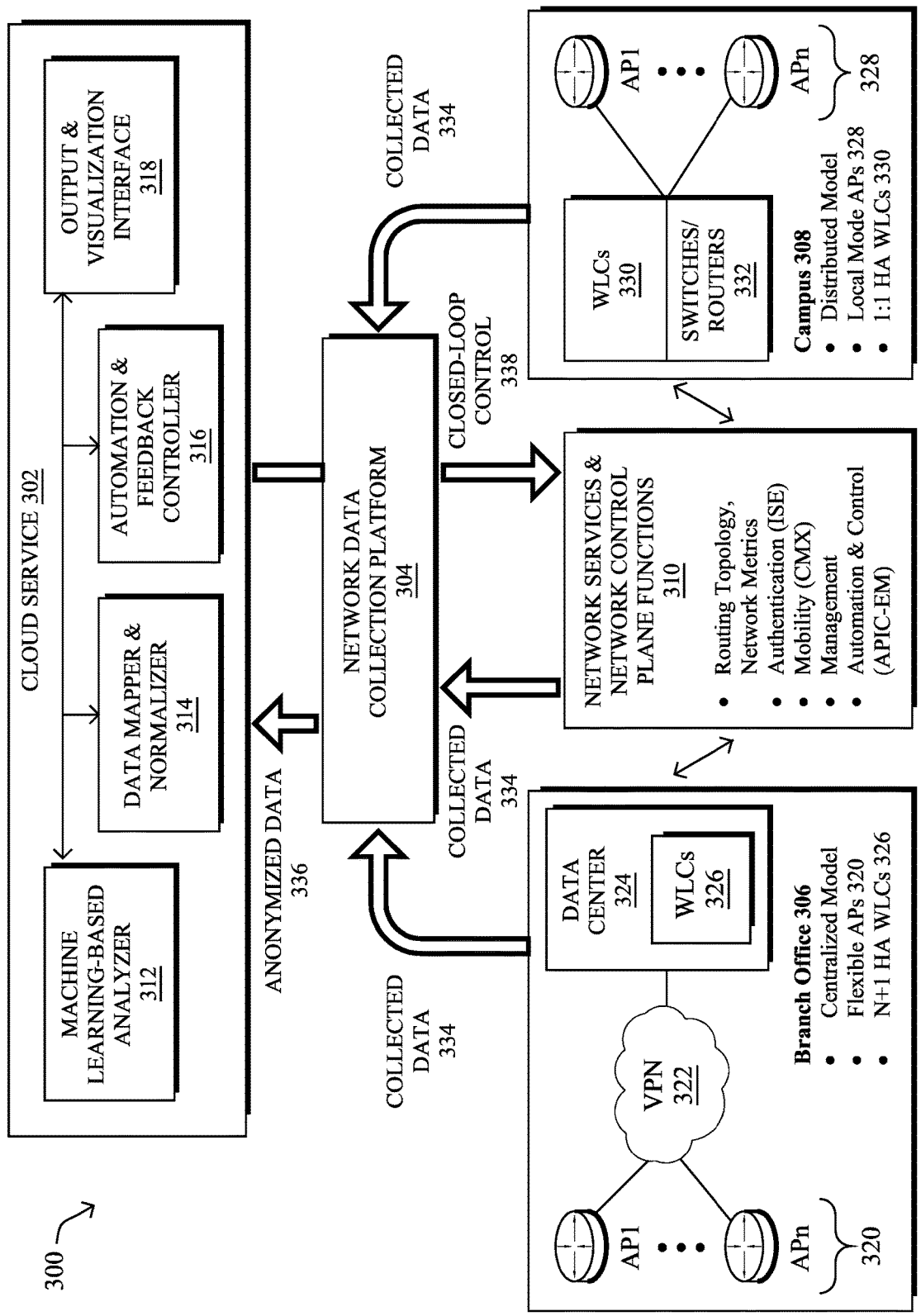
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g, the "stickiness" of clients to APs 320, 328, "ping-pong" clients, the number of visited APs 320, 328, roaming triggers, etc). Analyzer 312 may characterize such patterns by the nature of the device (e.g, device type, OS) according to the place in the network, time of day, routing topology, type of AP/WLC, etc, and potentially correlated with other network metrics (e.g, application, QoS, etc.). In another example, the cognitive analytics model(s) may be configured to extract AP/WLC related patterns such as the number of clients, traffic throughput as a function of time, number of roaming processed, or the like, or even end-device related patterns (e.g, roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g, RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g, a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g, an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g, data rate, RF, etc.), the current observed load on the network, destination being reached, etc, is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g, an electronic display, a keypad, a speaker, etc.). For example, interface 318 may present data indicative of the state of the monitored network, current or predicted issues in the network (e.g, the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g, the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g, by signaling an endpoint to use a particular AP 320 or 328, etc.).

As noted above, networks, such as wireless/Wi-Fi networks, are inherently complex distributed systems where multiple network devices and protocols interact with each other. For example, most Wi-Fi deployments commonly have installations of hundreds to thousands of wireless access points (APs). These APs belong to natural groups such as APs that are on the same floor, APs that are deployed outdoors, APs in corridors, etc. It has been discovered that these groups tend to have similar behavior, both among each other, as well as over time. There are different ways these entity groups may be formed. For example, groupings may be based on which building in which the APs are deployed, or based on which switch or wireless LAN controller to which the APs are connected, or based on which APs share the same RF profiles, etc.

Network behavior also evolves at multiple time scales. Looking at data at a granular hourly or sub-hourly timescale focuses on momentary issues that are time sensitive in terms of root-causing and fixing. While one could focus only on real-time anomaly detection, taking a step back and looking at the behaviors of network entities at much larger time scales, such as weeks or months, also reveals slowly evolving behaviors, which would otherwise be discarded as noise at lower time scales. In addition, identifying entity groups of one or more network entities that have drastically changed their behavior in the recent past may indicate a problem in the network or a change in how the network is being used, requiring changes in the deployment configuration.

When referring to network behavior, there are many performance metrics/key performance indicators (KPIs) that can be used to quantify behavior in the network: average radio client count, signal-to-noise ratio (SNR), received signal strength indicator (RSSI), interference, traffic, etc. However, when looking at the possible KPIs, entities (grouping), and time scales, there is a geometric explosion of possible combinations to assess.

Detecting Network Entity Groups With Abnormal Time Evolving Behavior

The techniques herein introduce a mechanism to identify and rank groupings of one or more network entities in a monitored network that have suddenly changed their baseline behavior, enough to have an impact on the optimal operation of the network. Note that detecting change is usually even more critical than detecting persistent outliers since this could reflect a change in the network that is simply due to new constraints (e.g. new noise appearing in building) or a configuration change that had a negative impact on the network. In doing so, only the most critical entities are presented to the network administrator. Said differently, the techniques introduce a mechanism able to perform any or all of the following:

To identify entities and entity groups in the network with unusual time evolving trajectories and to rank abnormal behavior trajectories to pick the one that is of greatest interest to the network operator.

To automatically identify the right level of granularity (e.g, campus, building, floor etc.) that would be of greatest interest to the network operator.

To automatically adjust the system parameters to increase the rate of successful findings.

Specifically, according to one or more embodiments of the disclosure as described in detail below, a network assurance service that monitors a network calculates network frequency distributions of a performance measurement from the network over a plurality of different time periods. The service calculates entity frequency distributions of the performance measurement for a plurality of different groupings of one or more network entities in the network over the plurality of different time periods. The service determines distance measurements between the network frequency distributions and the entity frequency distributions. The service identifies a particular one of the grouping of one or more networking entities as an outlier, based on a change in distance measurements between the network frequency distributions and the entity frequency distributions for the particular grouping. The service provides an indication of the identified outlier grouping to a user interface.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
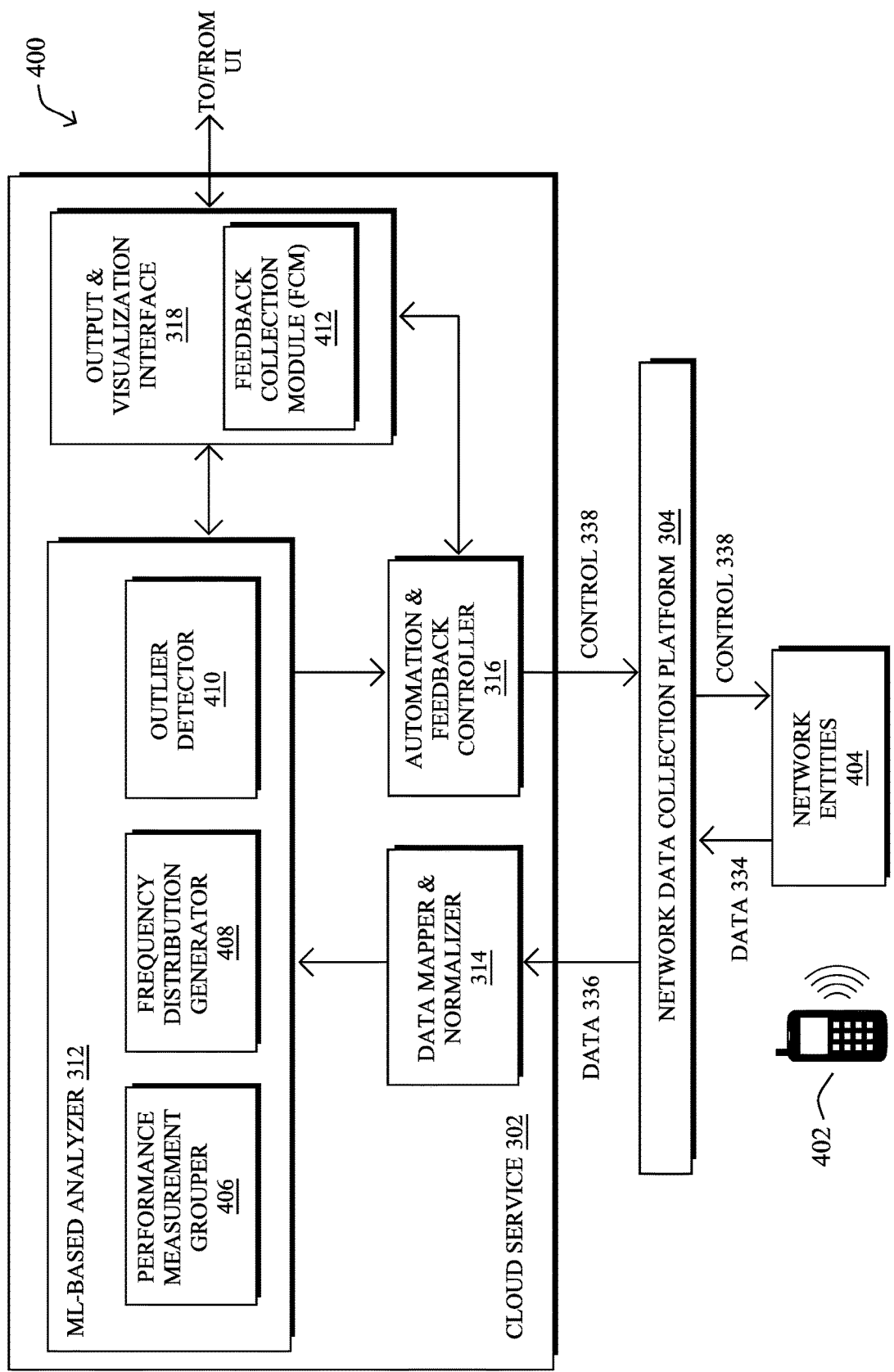
FIG. 4 illustrates an example architecture for detecting network entity groups with abnormal time evolving behavior.

Operationally, FIG. 4 illustrates an example architecture 400 for detecting network entity groups with abnormal time evolving behavior, according to various embodiments. At the core of architecture 400 may be the following components: a performance measurement grouper 406, a frequency distribution generator 408, an outlier detector 410, and/or a feedback collection module (FCM) 412. In some implementations, the components 406-412 of architecture 400 may be implemented within a network assurance system, such as system 300 shown in FIG. 3. Accordingly, the components 406-412 of architecture 400 shown may be implemented as part of cloud service 302 (e.g, as part of machine learning-based analyzer 312 and/or output and visualization interface 318), as part of network data collection platform 304, and/or on one or more network elements/entities 404 that communicate with one or more client devices 402 within the monitored network itself. Further, these components 406-412 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry data from the monitored network (e.g, anonymized data 336 and/or data 334) indicative of one or more performance measurements and, in turn, assess the data using machine learning-based analyzer 312. As noted above, when looking at the possible KPIs/performance measurements, entities (grouping), and time scales there is a geometric explosion of possible combinations that can be considered. For example, Table 1 below illustrates an example of the different KPIs, time windows, and entity groupings that can be combined for analysis by analyzer 312:

TABLE 1

| KPI (Z) | Time Window (X) | Entity Grouping (Y) |
|---|---|---|
| Avg Radio Client Count | Month | AP |
| | Week | AP Group |
| Interference | Day | WLC |
| Channel Utilization | Time of Day | WLC Version |
| Traffic | Day of Week | SSID |
| Avg Client RSSI | | Customer |
| Avg Client SNR | | Campus |
| Channel Change per AP | | Building, Floor |
| WLC CPU | | Device types |
| WLC Memory | | |
| Per client throughput | | |
| Bytes per application | | |
| Packet Failures | | |
| Onboarding | | |
| Roaming Failures | | |

As shown above, a "combination" may refer to a specific set of KPI(s)/performance measurement(s) (e.g, interference, traffic, etc.), for a specific time window (e.g, week, month, etc.), and for specific entity grouping (e.g, building, AP group etc.).

Even with the limited examples in Table 1 above, one can appreciate that the sheer number of possible combinations would overwhelm the user. Thus, in various embodiments, the techniques herein can be used to pick the most relevant, interesting, and/or actionable combination(s) for presentation via the user interface and with the optimal level of granularity.

In some aspects, the techniques propose comparing two or more combinations by looking at the frequency distribution of the KPI/performance measurement(s) for the given time-period and entity group, and use a distance measure that evaluates the difference (distance) between the frequency distributions. There are many distance measures that can be used to measure distribution-distance, in various embodiments, such as Earth Mover's Distance, Kolmogorov- Smirnov (KS) statistic, or the like, so long as it meets the minimum criteria for a distance metric. These criteria are: (i.) non-negativity, (ii.) if distance is zero, the distributions are identical, (iii.) the measure is symmetric in terms of calculation ((a→b) =(b→a)), (iv.) and it honors the triangle inequality((a→c)<(a→b)+(b→c)).

Figure 5:
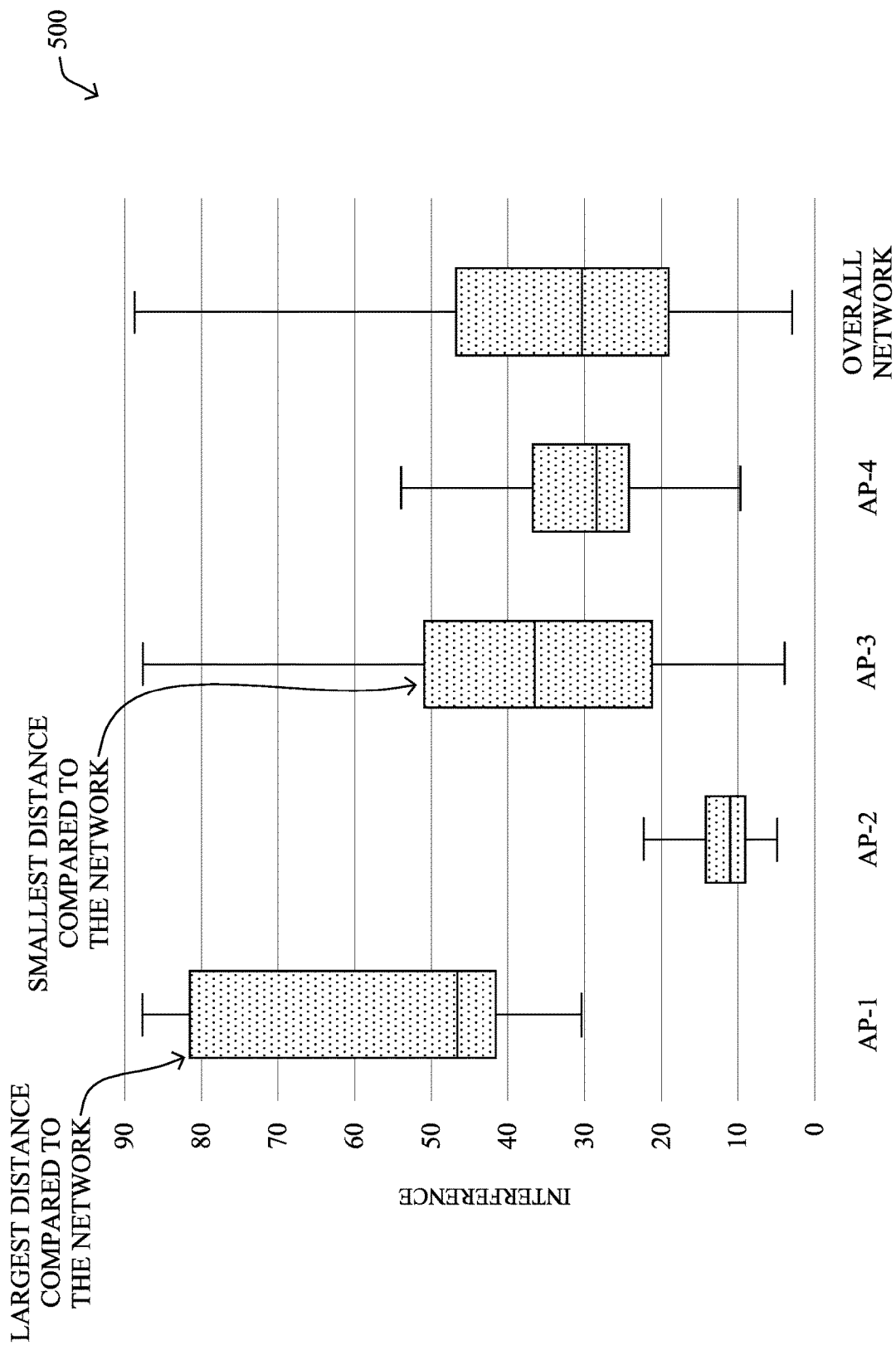
FIG. 5 illustrates an example plot of interference measurements from a network.

FIG. 5 illustrates an example plot 500 of interference measurements from a network, according to various embodiments. In particular, interference measurements were captured from the monitored network from a variety of APs over the course of a month: AP-1, AP-2, AP-3, and AP-4. The resulting interference distributions for these APs are illustrated in plot 500, as well as the interference distribution for the overall network. From plot 500, it can be seen that AP-1 has an interference distribution that is far away from the network distribution and, consequently, would have a high distance value. Conversely, the interference distribution for AP-3 is very close to that of the overall network and their distributions would have a small distance value.

Referring again to FIG. 4, performance measurement grouper 406 may be configured, generally, to group performance measurements by time window (e.g., same week, month, etc.) and/or by grouping of one or more network entities (e.g., AP group, SSID, etc.). In turn, frequency distribution generator 408 may calculate the frequency distribution for the resulting sets of performance measurements.

In some embodiments, when collecting data points for generation of the frequency distributions, performance measurement grouper 406 may apply one or more filters to the measurements, to remove spurious data points that might skew the data. There are two types of filters that grouper 406 may apply. The first filter is to make sure that the relevant metrics are within range, the idea being to prevent these noisy data points from an underutilized entity, say an AP, to be over-represented in the distribution. The second type of filter ensures that there are enough data points to build a distribution, as there might be APs or other networking entities in the network that are underutilized for the whole time period under consideration, to prevent these entities from skewing the results.

In other words, performance measurement grouper 406 may apply either or both of the following conditions to the measurements from the monitored network:
  Relevance Condition: The relevancy conditions are simple conditions on key metric ranges (e.g. 30-minute average radio client count per AP is at least 2, etc.). Such relevance conditions are usually driven by subject matter expertise that are in charge of setting up corresponding policies, such as a parameter set via output and visualization interface 318.
  Sufficiency Condition: To select measurements that meet this condition, grouper 406 may pick the entities that have a minimum sample count for the measurements and are not in the bottom percentiles of the distribution.

Figure 6:
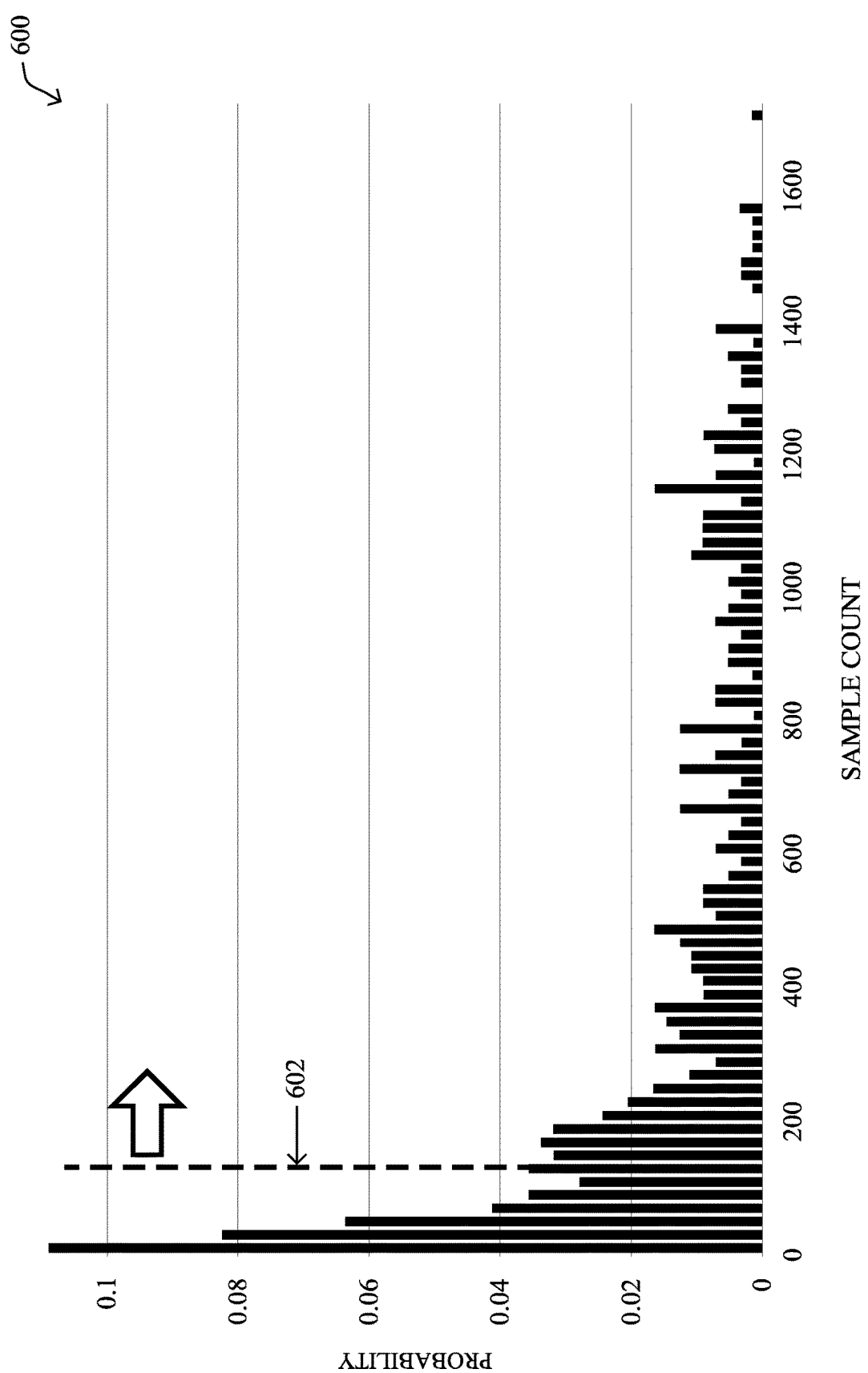
FIG. 6 illustrates an example plot of sample counts from a monitored network.

Referring briefly to FIG. 6, an example plot 600 of sample counts from a monitored network is shown. To satisfy the sufficiency condition above, performance measurement grouper 406 may pick only those entities that have a minimum sample count and are not in the bottom percentiles of the distribution. For example, grouper 406 may only select those samples to the right of line 602 shown, which corresponds to approximately the $65^{th}$ percentile. In other words, grouper 406 may purposely filter out samples of the performance measurement from entities that have an amount of samples below a predefined threshold.

Referring again to FIG. 4, once performance measurement grouper 406 has applied any filtering to the performance measurements (e.g., to consider only those performance measurements that satisfy the relevance and/or sufficiency conditions), the system may operate as follows:

Performance measurement grouper 406 may start at the lowest granularity (coarsest) for the entity grouping (e.g., a campus, a building, a floor) and go down the hierarchy (e.g., from campus-level grouping to building-level grouping, etc.), to form groupings of one or more entities. Similarly, performance measurement grouper 406 may also start at the broadest time period (e.g., month-level, etc.) and go down the hierarchy (e.g., from month-level grouping to week-level, etc.), to select qualifying performance measurements from those time periods that are associated with the selected entity groupings, as well as for the network as a whole.

In turn, for a given KPI/performance measurement, frequency distribution generator 408 may use the groupings from performance measurement grouper 406 to compute the following:
  The frequency distribution of the KPI/performance measurement for the whole network, for each of the time periods in the sequence. Such a frequency distribution is referred to herein as the network frequency distribution function (FDF) for that time period.
  The frequency distribution of the KPI/performance measurement for each entity grouping during each of the time periods. Such a frequency distribution is referred to herein as an entity FDF.

Figure 7:
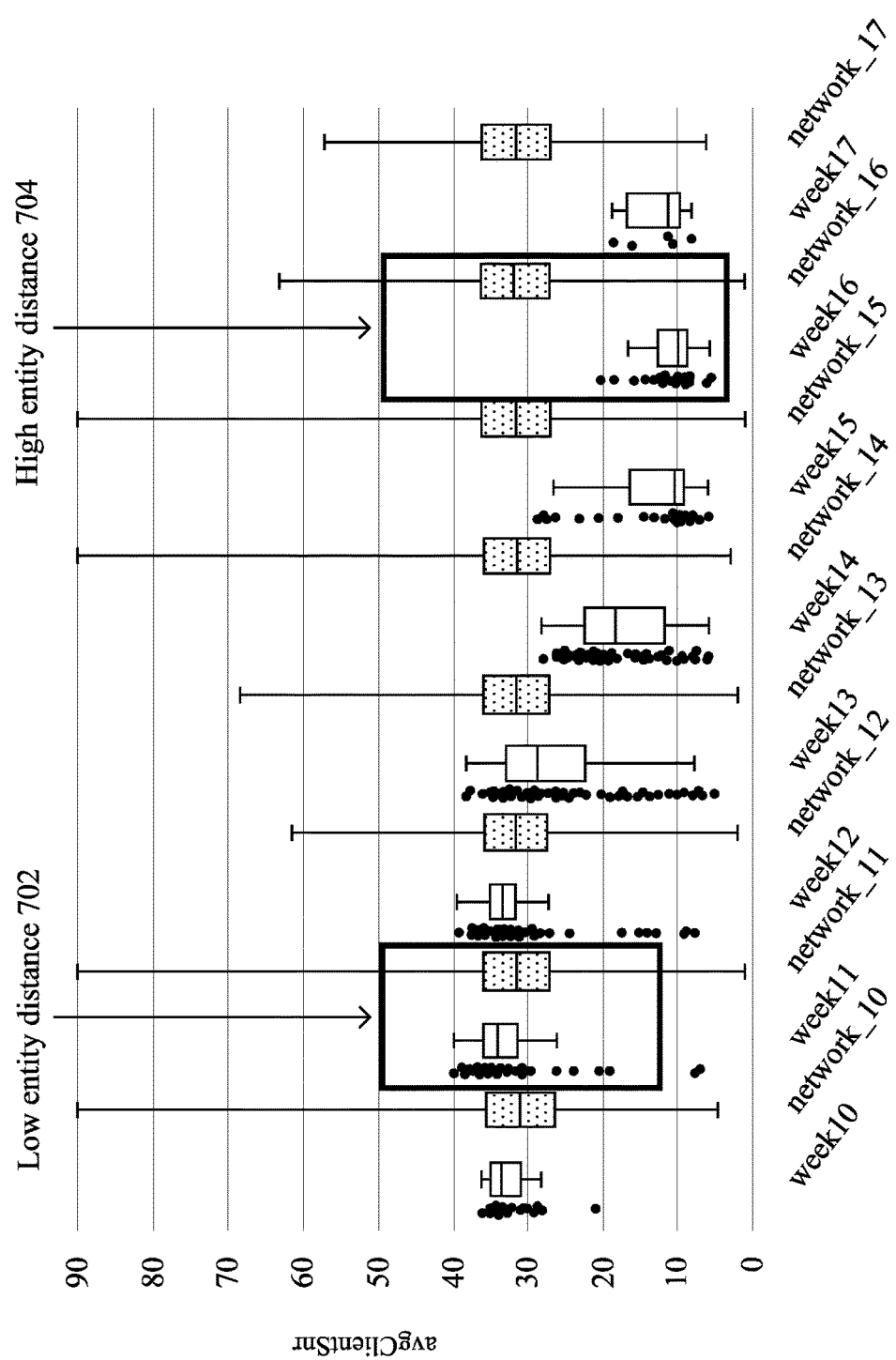
FIG. 7 illustrates an example plot of entity distance metrics.

To detect an outlier grouping of one or more network entities 404, outlier detector 410 may calculate the distance measurement (e.g., distribution distance) between the network FDF and each entity FDF, for every time period considered. The resulting distance measurement is referred to herein as the entity distance. For example, as shown in plot 700 in FIG. 7, region 702 illustrates a time period during which the entity FDF exhibits a low entity distance from that of the network FDF (i.e, is fairly similar to that for the entire network). Conversely, region 704 of plot 700 illustrates a time period during which the entity FDF greatly differs from that of the network FDF.

Referring again to FIG. 4, once outlier detector 410 has calculated the entity distances between the entity and network FDFs across all of the time periods in the sequence, it may order the entity groupings and calculate the entity distance span (EDS) as the range of entity distances, in various embodiments.

Given the entity distance and EDS, outlier detector 410 may identify either or both of the following types of outliers. The first type of outlier includes the top N-number of entities in the network for a given time period that are the farthest from the overall network, which outlier detector 410 can determine by looking at the largest entity distance above a minimum threshold, for a given time period. In other words, outlier detector 410 may look at outliers based on the distance metric itself (e.g., the networking gear that more different than others, etc.). The second type of outlier includes the top M-number of entities from the ordered list for each KPI, with the highest EDS above a minimum threshold. In other words, outlier detector 410 may flag network entities 404 that have had the largest change in their frequency distribution over the observed time period as outliers.

Figure 8:
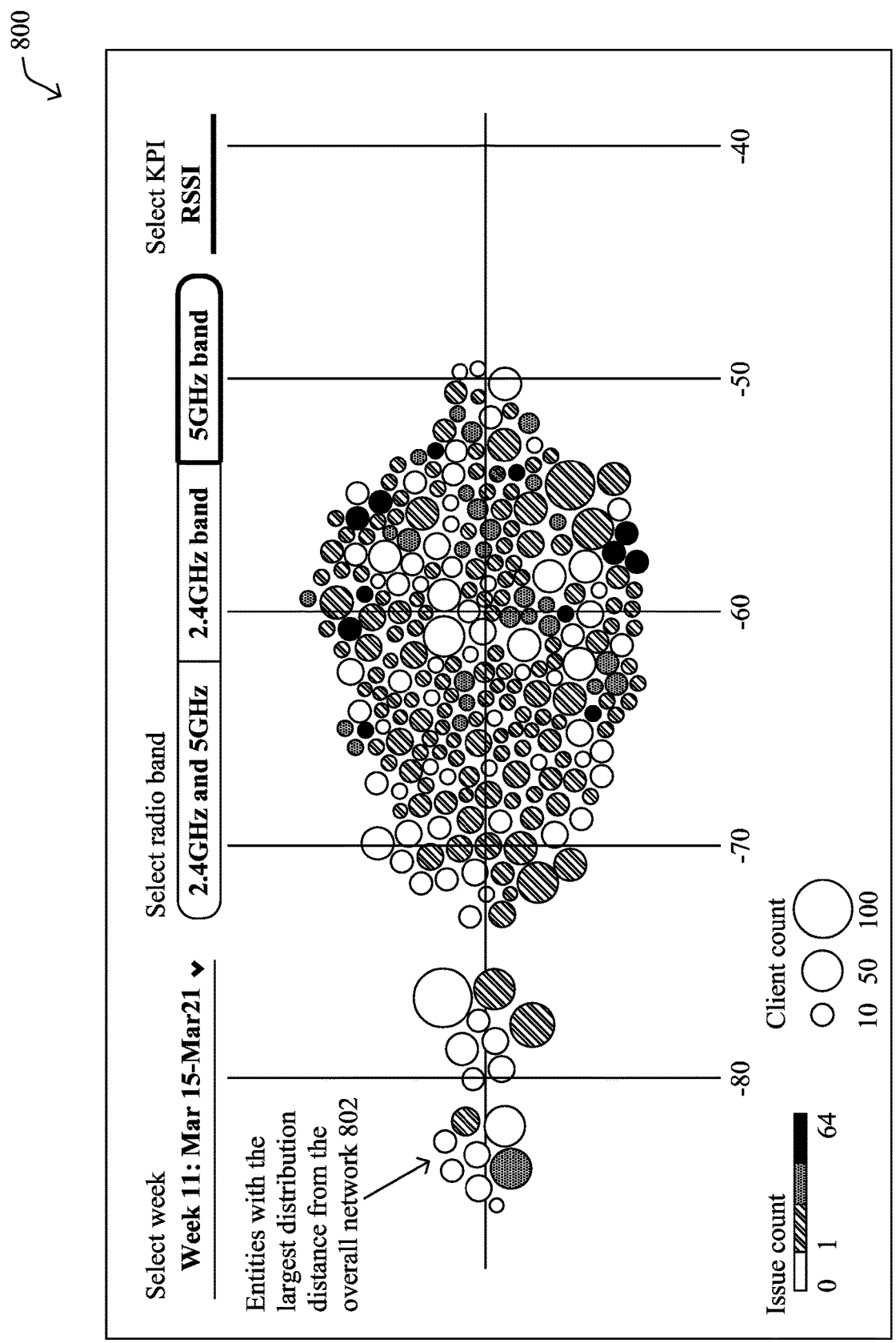
FIG. 8 illustrates an example user interface indicating outlier entity groups.

Once outlier detector 410 has flagged an entity as an outlier, either due to its performance relative to that of the network, and/or due to a change in its performance relative to the network over time, outlier detector 410 may send an indication of the outlier to the user interface via output and visualization interface 318 for review. FIG. 8 illustrates one such display screen 800 that may be presented via the user interface. As shown, during the week of March 15 through March 21, certain entities 802 are very different than the rest of the network in this time period and may be of interest to the user. In other words, these entities 802 may be identified as the first type of outlier, based on their entity distances exceeding an entity distance threshold or are in the top N-number of entity groupings in terms of entity distances.

Figure 9:
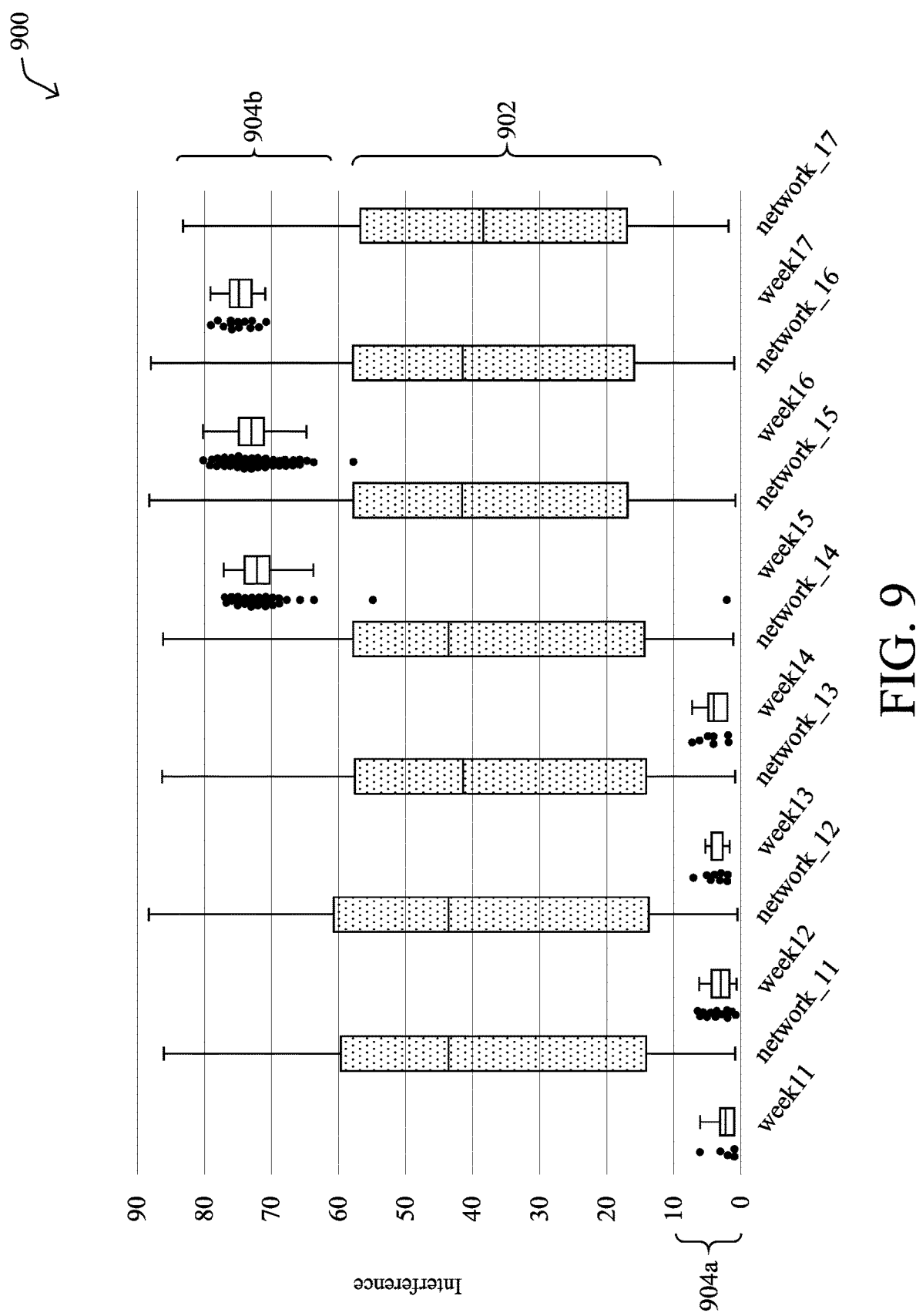
FIG. 9 illustrates an example plot of a change in entity distance metrics.

FIG. 9 illustrates an example of the second type of outlier that outlier detector 410 may detect. As shown in plot 900, consider the network FDFs 902 for each of a series of weeks and entity FDFs 904a-904b also calculated for these time periods. As shown, the entity FDF suddenly jumps at week 14 from 904a to 904b, resulting in a very large EDS for this entity grouping. Based on this large change in behavior, outlier detector 410 may flag this entity grouping as an outlier and provide information regarding the grouping to the user.

Referring yet again to FIG. 4, in some embodiments, for purposes of reporting, outlier detector 410 may also report only on those entity groupings that had a KPI/performance measurement change that made the network worse. For example, even if there is a behavioral change within an entity grouping, outlier detector 410 may only report on this grouping if its change was for the worse (e.g, interference increases, SNR drops, etc.). If outlier detector 410 finds nothing at any level of granularity, components 406-410 may move on to the next KPI/performance measurement for analysis. Components 406-410 may also periodically repeat the above, to identify interesting insights to present to the operator, every week, every month, etc.

According to various embodiments, architecture 400 may also include feedback collection module (FCM) 412, such as part of output and visualization interface 318 or other element of architecture 400. During operation, FCM 412 is responsible for collecting feedback on different outliers reported by service 302. In a simple embodiment, FCM 412 may include a combination of UI elements provided to the UI (e.g, a display, etc.), application programming interfaces (APIs), and/or databases that allow rankers to provide explicit feedback on the different outliers flagged by service 302. These feedbacks are typically in the form of like/dislike cues. In another embodiment, FCM 412 may allow for feedback in the form of free-form text input from the UI and leverage Natural Language Understanding and Sentiment Analysis to assign scores to the reported outliers. Such an embodiment makes the process more natural to the user, but at the expense of a level of indirection that must be accounted for when exploiting these feedbacks.

In some cases, components 406-412 may also be configured to dynamically adjust the minimum EDS threshold and/or entity distance threshold used by outlier detector 410 to detect outliers, based on the feedback from FCM 412. For example, FCM 412 may receive feedback from the user regarding the relevancy/interest associated with a reported outlier and adjust the threshold(s), so as to improve the rate of successful findings. In further embodiments, the system itself may make the adjustment automatically from another system that assesses the quality of an outlier finding.

Figure 10:
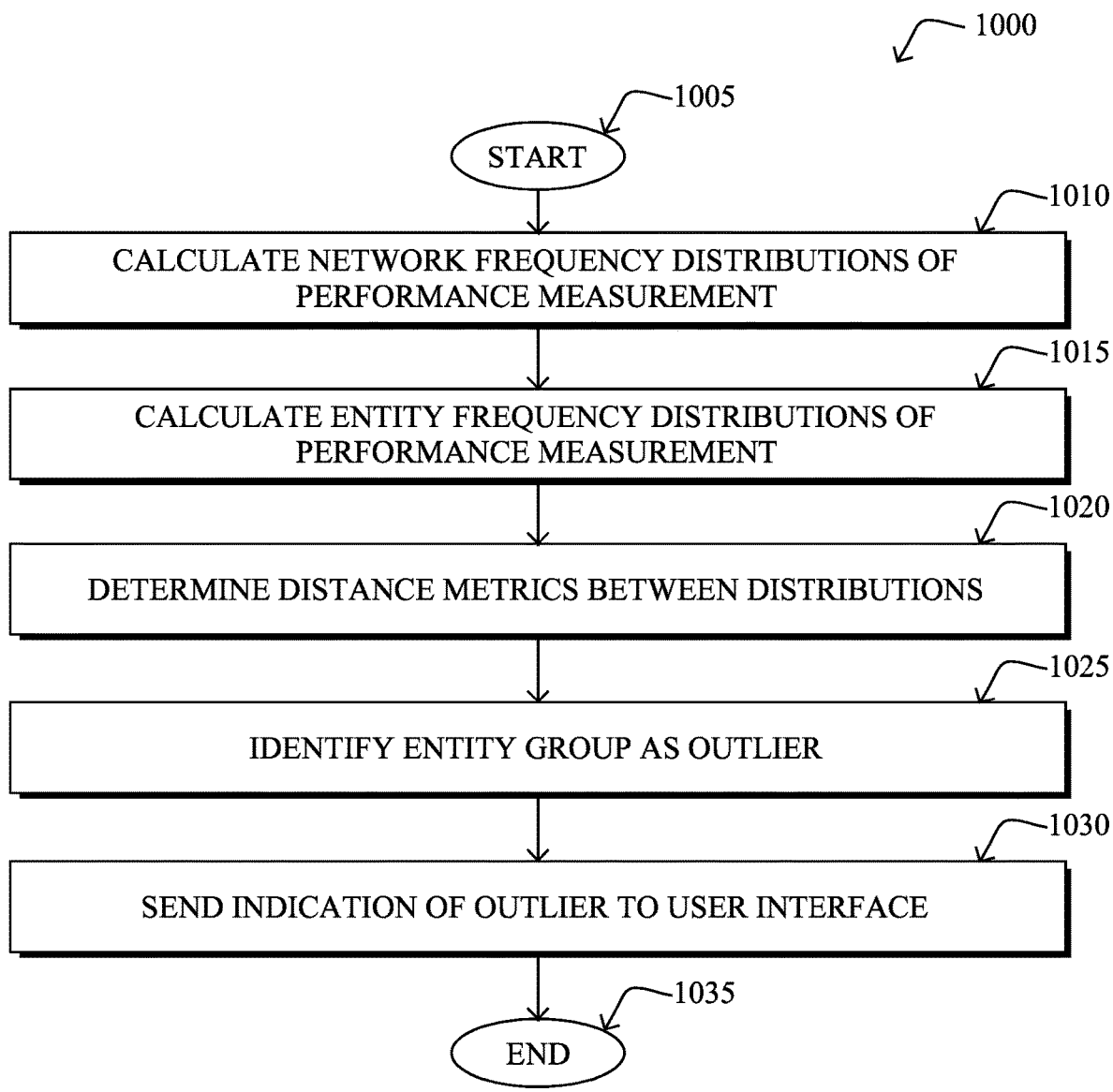
FIG. 10 illustrates an example simplified procedure for detecting network entity groups with abnormal time evolving behavior.

FIG. 10 illustrates an example simplified procedure for detecting network entity groups with abnormal time evolving behavior, in accordance with one or more embodiments described herein. For example, a non-generic, specifically configured device (e.g, device 200) may perform procedure 1000 by executing stored instructions (e.g, process 248), to provide a network assurance service to a monitored network. The procedure 1000 may start at step 1005, and continues to step 1010, where, as described in greater detail above, the network assurance service may calculate network frequency distributions of a performance measurement from the network over a plurality of different time periods. For example such a performance measurement may comprise at least one of: average radio client count, interference, channel utilization, average client received signal strength indicator (RSSI), average client signal to noise ratio (SNR), channel change per wireless access point, wireless access point controller resource utilization, or roaming failures.

At step 1015, as detailed above, the network assurance service may calculate entity frequency distributions of the performance measurement for a plurality of different groupings of one or more network entities in the network over the plurality of different time periods. For example, such a grouping may be a group of one or more wireless access points, a group of one or more network entities associated with a particular service set identifier, a group of one or more network entities associated with a particular version of wireless access point controller, or a group of one or more network entities associated with a particular location.

At step 1020, the network assurance service may determine distance measurements between the network frequency distributions and the entity frequency distributions, as described in greater detail above. For example, in some embodiments, the distance measurements may be Earth Mover's Distance measurements, Kolmogorov-Smirnov statistics, or any other suitable distance measurement.

At step 1025, as detailed above, the network assurance service may identify a particular one of the grouping of one or more networking entities as an outlier. Such a determination may be on a change in distance measurements between the network frequency distributions and the entity frequency distributions for the particular grouping. For example, if the distance measurements suddenly change by a threshold amount, this may indicate that the corresponding entity grouping is an outlier. In further embodiments, the network assurance service may identify an entity grouping as an outlier based on any of its distance measurements exceeding a predefined threshold.

At step 1030, the network assurance service may provide an indication of the identified outlier grouping to a user interface, as described in greater detail above. For example, the service may send display data to the user interface that indicates the one or more network entities (e.g, AP, WLC, etc.) in the entity grouping flagged by the service as an outlier. Procedure 1000 then ends at step 1035.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for detecting network entity groups with abnormal time evolving behavior, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
calculating, by a network assurance service that monitors a network, network frequency distributions of a performance measurement from the network over a plurality of different time periods;
calculating, by the network assurance service, entity frequency distributions of the performance measurement for a plurality of different groupings of one or more network entities in the network over the plurality of different time periods;
determining, by the network assurance service, distance measurements between the network frequency distributions and the entity frequency distributions;
calculating, by the network assurance service, a change in the distance measurements between the network frequency distributions and the entity frequency distributions over the plurality of different time periods;
identifying, by the network assurance service, a particular one of the plurality of different groupings of one or more networking entities as an outlier when the calculated change in the distance measurements between the network frequency distributions and the entity frequency distributions for the particular grouping over at least one of the plurality of different time periods exceeds a predefined distance span threshold; and
providing, by the network assurance service, an indication of the identified outlier grouping to a user interface.

2. The method as in claim 1, wherein the performance measurement comprises at least one of: average radio client count, interference, channel utilization, average client received signal strength indicator (RSSI), average client signal to noise ratio (SNR), channel change per wireless access point, wireless access point controller resource utilization, or roaming failures.

3. The method as in claim 1, wherein the groupings of one or more network entities comprise at least one of: a group of one or more wireless access points, a group of one or more network entities associated with a particular service set identifier, a group of one or more network entities associated with a particular version of wireless access point controller, or a group of one or more network entities associated with a particular location.

4. The method as in claim 1, wherein the distance measurements comprise Earth Mover's Distance measurements or Kolmogorov-Smirnov statistics.

5. The method as in claim 1, further comprising:
selecting, by the network assurance service, the groupings of one or more network entities based in part on sample counts of the performance measurement for a grouping exceeding a predefined sufficiency threshold.

6. The method as in claim 5, further comprising:
selecting, by the network assurance service, the groupings of one or more network entities based further in part on values of the performance measurement exceeding a predefined relevance threshold.

7. The method as in claim 1, further comprising:
receiving feedback from the user interface regarding the identified outlier; and
adjusting the distance span threshold based on the received feedback from the user interface.

8. The method as in claim 1, wherein identifying the particular one of the grouping of one or more networking entities as an outlier comprises:
sorting the groupings of one or more network entities by distance measurement for a particular one of the time periods; and
selecting the outlier grouping from among the sorted groupings based in part on the distance measurement associated with the outlier grouping for the particular time period exceeding a distance threshold.

9. An apparatus, comprising:
one or more network interfaces to communicate with a network;
a processor coupled to the network interfaces and configured to execute one or more processes; and
a memory configured to store a process executable by the processor, the process when executed configured to:
calculate network frequency distributions of a performance measurement from a monitored network over a plurality of different time periods;
calculate entity frequency distributions of the performance measurement for a plurality of different groupings of one or more network entities in the network over the plurality of different time periods;
determine distance measurements between the network frequency distributions and the entity frequency distributions;
calculate a change in the distance measurements between the network frequency distributions and the entity frequency distributions over the plurality of different time periods;
identify a particular one of the plurality of different groupings of one or more networking entities as an outlier when the calculated change in the distance measurements between the network frequency distributions and the entity frequency distributions for the particular grouping over at least one of the plurality of different time periods exceeds a predefined distance span threshold; and
provide an indication of the identified outlier grouping to a user interface.

10. The apparatus as in claim 9, wherein the performance measurement comprises at least one of: average radio client count, interference, channel utilization, average client received signal strength indicator (RSSI), average client signal to noise ratio (SNR), channel change per wireless access point, wireless access point controller resource utilization, or roaming failures.

11. The apparatus as in claim 9, wherein the groupings of one or more network entities comprise at least one of: a group of one or more wireless access points, a group of one or more network entities associated with a particular service set identifier, a group of one or more network entities associated with a particular version of wireless access point controller, or a group of one or more network entities associated with a particular location.

12. The apparatus as in claim 9, wherein the distance measurements comprise Earth Mover's Distance measurements or Kolmogorov-Smirnov statistics.

13. The apparatus as in claim 9, wherein the process when executed is further configured to:
   select the groupings of one or more network entities based in part on sample counts of the performance measurement for a grouping exceeding a predefined sufficiency threshold.

14. The apparatus as in claim 13, wherein the process when executed is further configured to:
   select the groupings of one or more network entities based further in part on values of the performance measurement exceeding a predefined relevance threshold.

15. The apparatus as in claim 9, wherein the process when executed is further configured to:
   receive feedback from the user interface regarding the identified outlier; and
   adjust the distance span threshold based on the received feedback from the user interface.

16. The apparatus as in claim 9, wherein the apparatus identifies a particular one of the grouping of one or more networking entities as an outlier further by:
   sorting the groupings of one or more network entities by distance measurement for a particular one of the time periods; and
   selecting the outlier grouping from among the sorted groupings based in part on the distance measurement associated with the outlier grouping for the particular time period exceeding a distance threshold.

17. A tangible, non-transitory, computer-readable medium storing program instructions that cause a network assurance service that monitors a network to execute a process comprising:

calculating, by the network assurance service, network frequency distributions of a performance measurement from the network over a plurality of different time periods;
calculating, by the network assurance service, entity frequency distributions of the performance measurement for a plurality of different groupings of one or more network entities in the network over the plurality of different time periods;
determining, by the network assurance service, distance measurements between the network frequency distributions and the entity frequency distributions;
calculating, by the network assurance service, a change in the distance measurements between the network frequency distributions and the entity frequency distributions over the plurality of different time periods;
identifying, by the network assurance service, a particular one of the plurality of different groupings of one or more networking entities as an outlier when the calculated change in the distance measurements between the network frequency distributions and the entity frequency distributions for the particular grouping over at least one of the plurality of different time periods exceeds a predefined distance span threshold; and
providing, by the network assurance service, an indication of the identified outlier grouping to a user interface.

18. The computer readable medium as in claim 17, wherein the process further comprises:
   selecting, by the network assurance service, the groupings of one or more network entities based in part on sample counts of the performance measurement for a grouping exceeding a predefined sufficiency threshold.

\* \* \* \* \*

UNITED STATES PATENT AND TRADEMARK OFFICE
CERTIFICATE OF CORRECTION

PATENT NO. : 10,938,664 B2
APPLICATION NO. : 16/132933
DATED : March 2, 2021
INVENTOR(S) : Vikram Kumaran et al.

Page 1 of 1

It is certified that error appears in the above-identified patent and that said Letters Patent is hereby corrected as shown below:

In the Specification

Column 5, Line 38, please amend as shown:
Cisco Systems, Inc., another operating system, etc.), portions Column 6, Line 20, please amend as shown:
wireless controller may send a reason _code to the assurance Column 7, Line 58, please amend as shown:
AP1 through nth access point, APn) through which endpoint Column 8, Line 6, please amend as shown:
AP1 through nth access point APm) that provide connective- Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*